Oct. 18, 1932.  E. H. REMDE  1,883,319
INDUSTRIAL TRUCK
Filed Oct. 23, 1926  5 Sheets-Sheet 1
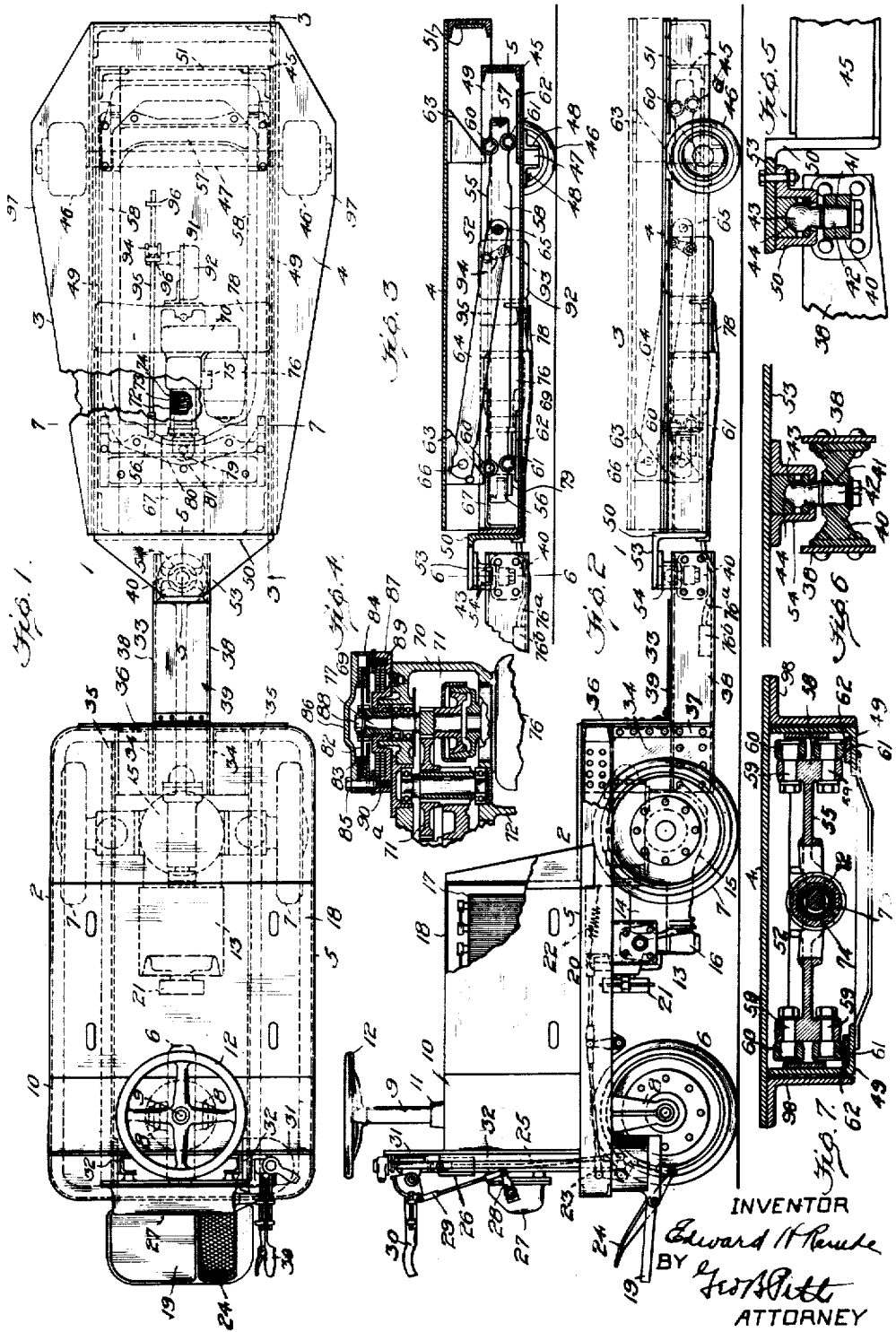
INVENTOR
Edward H Remde
BY
ATTORNEY

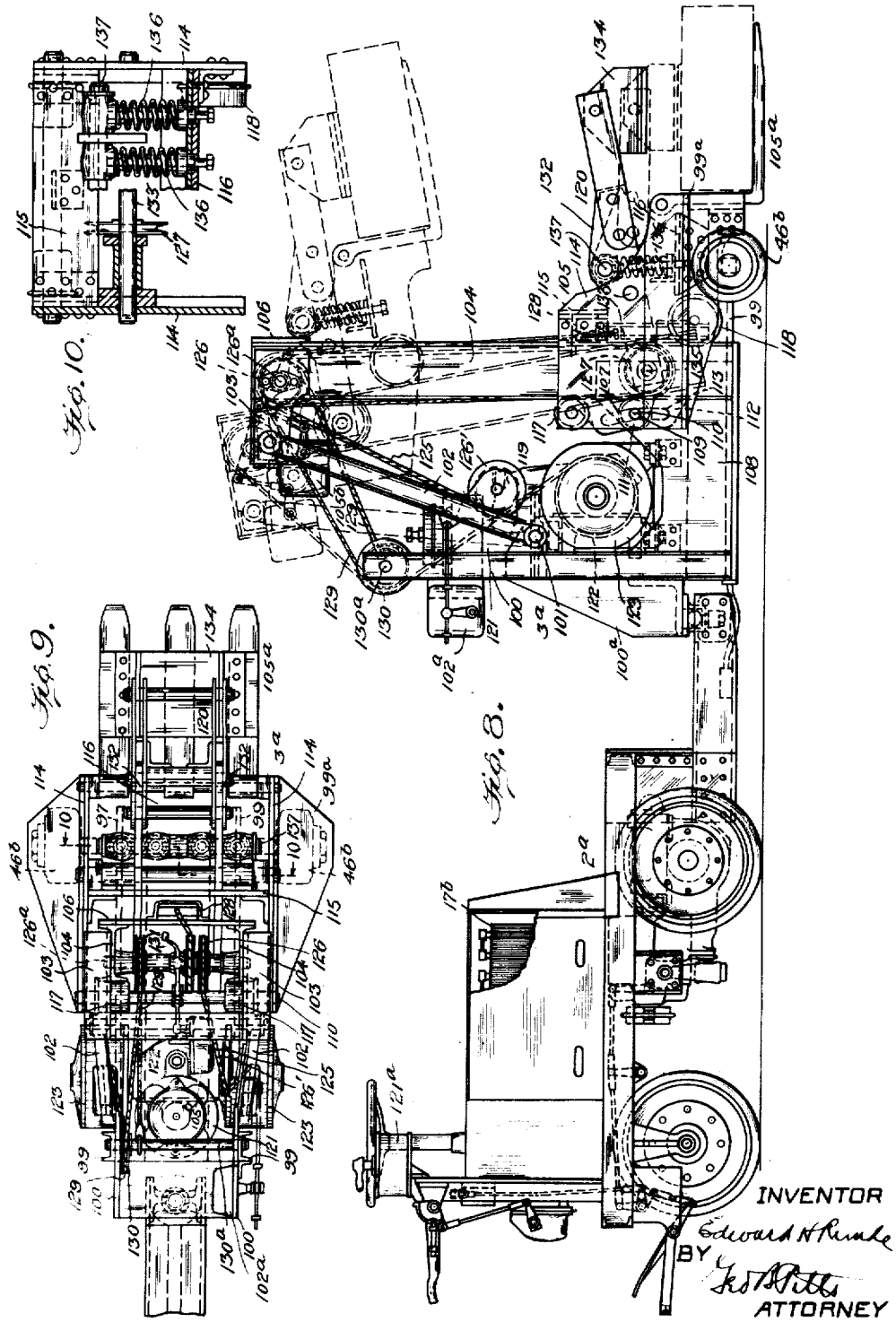

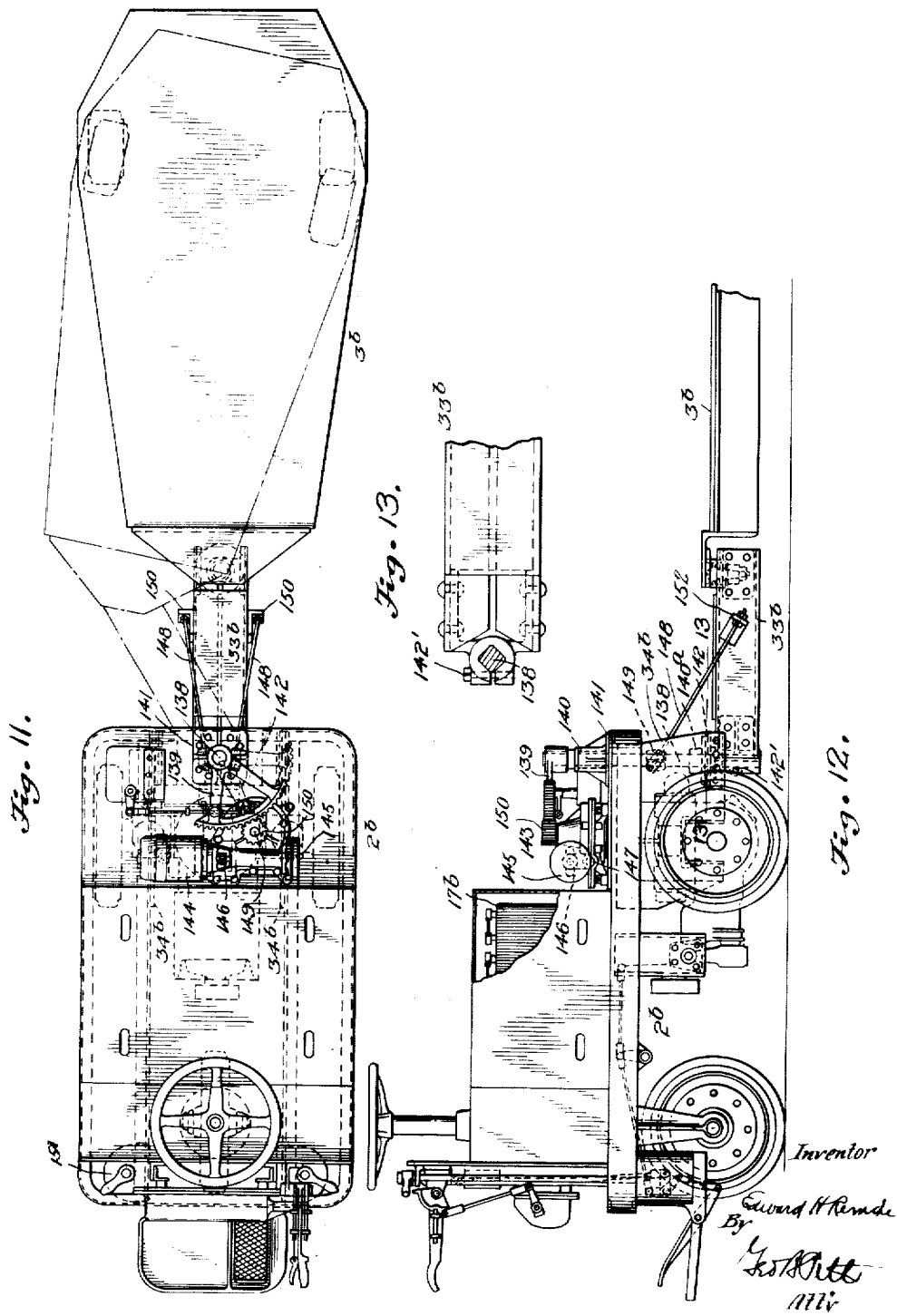

Oct. 18, 1932.  E. H. REMDE  1,883,319
INDUSTRIAL TRUCK
Filed Oct. 23, 1926   5 Sheets-Sheet 4
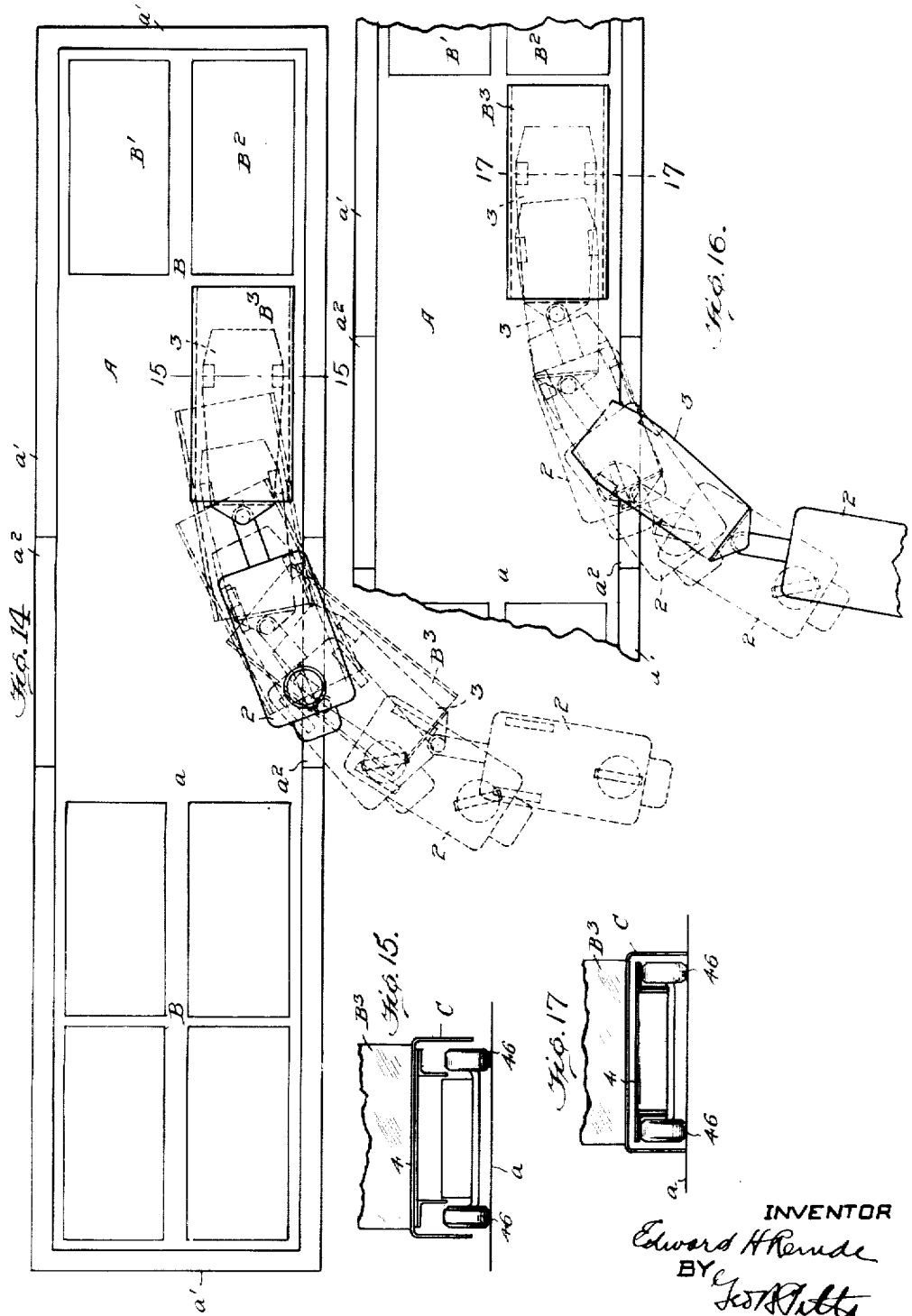

Oct. 18, 1932.  E. H. REMDE  1,883,319
INDUSTRIAL TRUCK
Filed Oct. 23, 1926  5 Sheets-Sheet 5
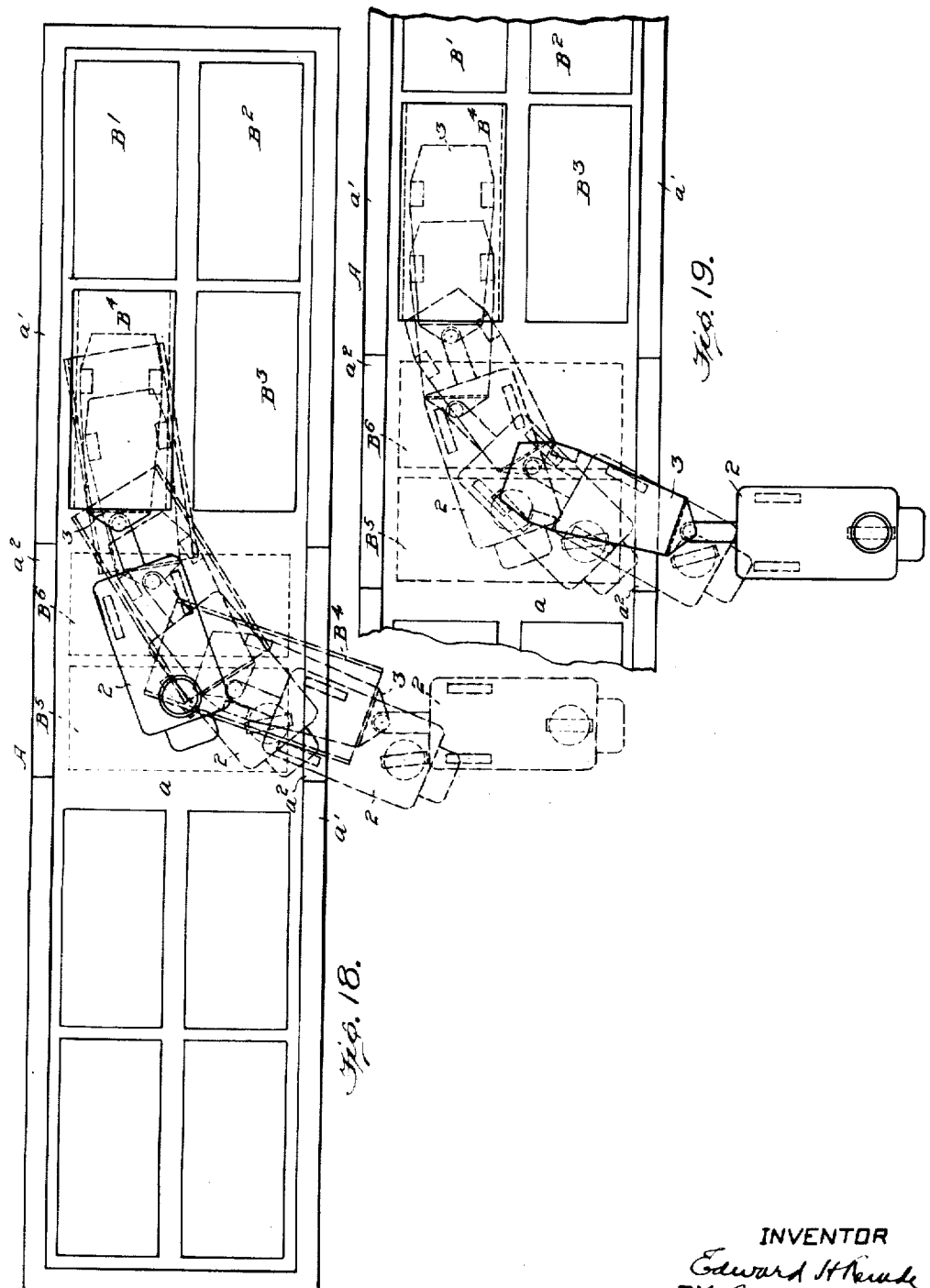

Patented Oct. 18, 1932

1,883,319

UNITED STATES PATENT OFFICE

EDWARD H. REMDE, OF CLEVELAND, OHIO, ASSIGNOR TO THE BAKER-RAULANG COMPANY, OF CLEVELAND, OHIO, A CORPORATION OF OHIO

INDUSTRIAL TRUCK

Application filed October 23, 1926. Serial No. 143,701.

This invention relates to a process of loading and unloading compartments (such as freight cars) of predetermined capacity and an improved truck for carrying out such process.

Heretofore great difficulty has been experienced in mechanically loading carriers, for example, freight cars of the box type to full capacity, particularly where the load units were of large size, due to the fact that the trucks, which are usually of the elevating or tiering type, could not be operated to carry the loads into the car, place them in their final position and then the empty truck be driven away. Where the units were of relatively large size and only a limited number were required to take advantage of the full area of the car, these trucks have been found to be impractical because only one or two load units, if any, could be transported into and positioned in the car, thereby leaving the remainder to be handled manually.

According to my process I am enabled to handle all of the load units required to either load the car to full capacity or to unload the units therefrom readily and in an economical manner with respect to both time consumed and labor required, as well as with less danger of damaging the loads.

My process is particularly adapted for handling load units of uniform size. In the example taken for illustration herein (see Figs. 14 to 19) each load measures three feet six inches wide, seven feet six inches long and five feet high and the car is forty two feet long and eight feet wide and has a door that is eight feet wide; but these latter dimensions will vary since present types of freight cars are of different sizes.

One object of the invention is to provide an improved process of positioning load units in a freight car to completely load it or removing the units therefrom.

Another object of the invention is to provide an improved truck capable of carrying out my improved process and also capable of picking up or discharging loads located in positions where the truck cannot be manipulated in a rectilinear direction to engage or discharge the load, thereby permitting the handling of loads into and out of positions at angles to aisles or transporting lanes on floors and/or between obstructions which would prevent the manipulation of the ordinary types of trucks including elevating platform or tiering trucks.

A further object of the invention is to construct a truck having relatively movable load handling and traction portions so connected that steering of the traction portion will readily effect steering and manipulation of the load handling portion to move it into a position to engage or discharge a load arranged at an angle to the open floor space or driving lane or adjacent areas too small to accommodate a truck of the usual type when operated in a rectilinear direction toward and from the load.

Another object of the invention is to provide a truck having traction and load handling portions connected by a power operated device arranged to effect movement of the load handling portion irrespective of the operation of the steering devices for the traction portion, whereby it is possible to positively control the load handling portion in or under congested conditions and the range of use of the truck is greatly increased.

Other objects of the invention will be apparent to those skilled in the art to which my invention relates from the following description taken in connection with the accompanying drawings, wherein Fig. 1 is a plan view of a truck embodying my invention and capable of carrying out my process.

Fig. 2 is a side view of the truck.

Fig. 3 is a fragmentary section on the line 3—3 of Fig. 1.

Fig. 4 is a fragmentary plan view of the load platform motor and driving means, partly in section.

Fig. 5 is a fragmentary section of parts shown in Fig. 3 on the line 5—5 of Fig. 1.

Fig. 6 is a section on the line 6—6 of Fig. 3.

Fig. 7 is a section on the line 7—7 of Figs. 1 and 3.

Fig. 8 is a side elevation of a truck embodying my invention, but showing another modified form of construction.

Fig. 9 is a fragmentary plan view of parts shown in Fig. 8.

Fig. 10 is a section on the line 10—10 of Fig. 9.

Fig. 11 is a plan view of a truck showing a different form of construction in which the connection between the traction and load carrying portions is mounted to swing relative to one of said portions to positively manipulate and control the movement of the load carrying portion.

Fig. 12 is a fragmentary side view of the truck shown in Fig. 11.

Fig. 13 is a fragmentary section on the line 13—13 of Fig. 12.

Fig. 14 is a diagrammatic view showing the partial loading of a freight car in carrying out my process.

Fig. 15 is a section on the line 15—15 of Fig. 14.

Fig. 16 is a view similar to Fig. 14, but showing the manner of removing the truck.

Fig. 17 is a section on the line 17—17 of Fig. 16.

Fig. 18 is a diagrammatic view showing the positioning of the final load unit in the freight car.

Fig. 19 is a view similar to Fig. 18 showing the removing of the truck.

My improved truck may be of different forms of construction to suit varying conditions and particularly the size, shape and nature of the body or load unit to be lifted, transported and positioned in a carrier, such as a freight car or other compartment or in and among objects, bodies or stacked goods and merchandise.

Where the operations involve the loading or unloading of freight cars I prefer to use a jointed or two-part truck capable of turning in a relatively short radius and effecting positive control and movement of the load carrying portion of the truck; if the load units to be handled are relatively large and are not to be stacked one on the other, I prefer the form of truck constructions shown in Figs. 1 to 7, inclusive, 11 and 12, but if the load units are to be stacked in piles, I may use the form of truck construction shown in Figs. 8, 9 and 10, this latter form of construction as illustrated herein being particularly adapted for handling sheets of material in bundles.

Where the arrangement of the bodies, merchandise and machinery, either or all cause congested conditions, the form of construction shown in Figs. 11 and 12 may be used to advantage for reasons which will later appear.

Referring to Figs. 1 to 7, inclusive, the truck 1 comprises articulated portions or members 2, 3, the former serving as the traction and combined steering and control portion or member and the latter serving as the load handling and carrying portion or member, capable of picking-up a load unit and elevating it, holding it in elevated position while the truck is being driven to the unloading position or station and then discharging it; this latter operation in this form of construction being effected by the lowering of the elevating section or element, to wit, the platform 4.

The traction member 2 comprises a suitable frame 5, supported by wheels 6, 7, disposed below and near the opposite ends of the frame 5. The wheel 6 is supported between the forks 8 of a column 9, suitably mounted to rotate in the frame 5 and a super-frame 10, the bearing for the upper portion of the column in the latter frame being shown at 11. The upper end of the column 9 is provided with a steering wheel 12. The wheels 7 are driven through a suitable power transmission mechanism by a motor 13. The motor 13 is mounted in and secured to a cradle 14 which is shaped to form a housing 15 for the power transmission mechanism. The cradle 14 and housing 15 are preferably connected to the frame 5 by a suspension mechanism, one element of which is shown at 16. No claim is made herein to such mechanism since the same forms the subject-matter of an application Ser. No. 430,620 filed by John H. Hertner of Cleveland, Ohio and myself jointly (see Letters Patent 1,628,145). 17 indicates the source of power supply, that illustrated comprising batteries suitably connected to the motor 13 and also the motor for operating the loading handling mechanism to which reference will later be made. The batteries 17 are mounted on the frame 5 and may be enclosed in a casing 18. 19 indicates the platform on which the operative stands. 20 indicates as an entirety a brake mechanism, the braking elements of which engage a wheel 21 fixed to the extended end of the shaft for the motor 13, being normally biased into engagement with the wheel 21 by means of a spring 22. The braking elements are connected by a suitable linkage 23 to a foot pedal 24, associated with the platform 20 in convenient position for the operative to operate. When operated downwardly, the pedal 24 releases the braking elements from the wheel 21 and also, through a linkage 25, closes a switch in the motor circuit; this switch being mounted in a box or casing 26. 27 indicates a controller of any well known construction, being connected through an arm 28 and link 29 to a handle 30 in convenient position for operation by the operative. 31 indicates a dash mounted on uprights 32 and supporting the casing 26, controller 27 and handle 30.

33 indicates a connector extending outwardly from and preferably in a plane below the frame 5. The connector is connected to the lower ends of a pair of drop plates 34, the upper portions of which are inclined outwardly (see Fig. 1) and connected to the sills 35 forming part of the frame 5. The plates 34 may be braced by a plate 36 connected thereto by angles 37. The connector 33 may comprise two plates 38 having their flanges in opposed relation and connected by a plate 39. 40 indicates a bridge member disposed between and connected in a well known manner at its opposite ends to the channels 38. Midway between its ends, the bridge member 40 is formed with a tapered opening 41 in which is removably mounted the tapered wall of a pin 42 carrying at its upper end a ball 43. The ball 43 fits into a socket 44, suitably carried by the load handling and carrying member 3, whereby the ball and socket constitute a universal joint or connection between the truck members 2, 3, serving to support the front end of the portion 3 on the connector and to permit them to articulate either due to (a) change in inclination of the flooring or surfaces over which the truck is driven or (b) the steering of the truck and also control of either or both truck members to effect loading and unloading operations and in carrying out my process.

When the plates 38 consist of channel bars, the flanges at the free ends thereof are cut away to accommodate the ball 43 and socket 44 and to permit of their free movement.

The load handling and carrying member 3 comprises a frame 45 mounted on a plurality of wheels 46. In the illustrated form of construction I provide two wheels, suitably mounted on an axle 47 disposed intermediate the ends of the frame 45 and secured thereto by angles 48. The frame 45 consists of angles 49 connected together at their front ends by an angle 50 and at their rear ends by a channel 51, the flanges of the angles 49 being turned inwardly to form a support for the elevating mechanism 52. The overhanging flange 53 of the angle 50 supports on its under side a suitable casing 54 in which is mounted the socket 44.

The elevating mechanism 52 may be of any desired construction to raise and lower the platform 4, but by preference such mechanism is substantially similar to that disclosed in Letters Patent No. 1,527,136, dated Feb. 17, 1925, which issued upon the application of John H. Hertner.

The elevating mechanism 52 comprises generally a frame 55 having end members 56, 57, and side members 58.

At its opposite ends the walls of the frame 55 are thickened and formed with openings in which are mounted stub shafts 59. The upper shafts 59 carry the rollers 60, while the lower shafts carry rollers 61 which engage suitable guides 62 on the inturned flanges of the angles 49 and permit the frame 55 to move endwise horizontally in opposite directions to effect the raising and lowering of the platform 4. The lowermost or normal position of the platform 4 is shown in Figs. 2 and 7. When the platform 4 is in this position, the intermediate frame 55 is arranged adjacent to that end of the frame 45 remote from the batteries (see Fig. 2) and when moved forward, it operates through the engagement of the rollers 60 with inclines 63 suitably secured to the lower side of the platform 4, to elevate it to the position shown in Fig. 3. The platform 4 is held against longitudinal movement by a pair of links 64 preferably pivoted at their opposite ends in any well known manner to the frame members 49 and platform 4, as shown at 65, 66. As will be understood, the links 64 permit the platform 4 to move in a substantially vertical direction, but hold it against longitudinal movement in order that the rollers 60 may co-act with the inclines 63 to elevate the platform.

67 indicates means for maintaining the frame 55 in sliding engagement with its guides 62 thereby preventing tilting of the frame 55 or movement of its inner end upwardly due to the positioning of a load at or adjacent its outer end. The means 67 are secured to the frame 45, being preferably carried by the angle 50. In the illustrated form of construction, the means 67 comprise a plate extending over the frame 55 and having a downwardly bent section which is secured to the angle 50.

69 indicates the power mechanism for moving the frame 55 forwardly and rearwardly on the guides 62 to effect the raising and lowering of the platform 4. Of this mechanism, 70 indicates a casing forming a suitable chamber 71 for speed reducing gears 71a and a chamber 72 for a screw or worm 73 and a nut 74.

75 indicates a cradle or other suitable device for connecting an electric motor 76 to the casing 70, preferably that portion thereof forming the chamber 72. The motor 76 is supported so that it may be readily connected to a shaft 77 (see Fig. 4) of the gearing within the casing 70. The motor 76 is arranged to rotate the screw or worm 73 in either direction to raise or lower the platform 4. The motor 76 and casing 70 are rigidly connected to the frame members 49 and a cross member 78. The motor 76, speed reducing gears and other elements, forming part of the power mechanism are preferably constructed similarly to corresponding parts set forth in Letters Patent No. 1,505,889 dated August 19, 1924, and therefore further description will not be necessary herein.

The nut 74 preferably comprises a hollow thrust member, which slidably fits at its inner end into an opening, leading into the chamber 72. The outer end of the nut 74 is bifurcated at 79 to receive between them the web portion 80 or a lug carried by the intermediate frame 55. The bifurcations 79 and web portion 80 are formed with openings, adapted to register with each other to receive a pin 81, whereby the nut and frame 55 are connected together.

The motor 76 is supplied with current from the batteries 17 by a cable 76a, having a plug connection with a socket 76b carried on the connector 33 (see Figs. 2 and 3).

The shaft 77 extends through the casing 70 and carries on its outer or free end a disk 82, which constitutes one element of a brake 83. The other element of the brake consists of a disk 84 held against rotation by a series of bolts 85 which secure the cover 86 to a plate 87 having a boss fitting the bearing opening and secured therein by the shoulder of a sleeve secured on the outer end of the shaft 77 by a nut 88, the latter also securing the brake element 82 to the shaft. The non-rotatable disk 84 is normally pressed outwardly by a plurality of springs (one being shown at 89 in Fig. 4) into engagement with the disk 82 to brake it or hold it against rotation. The disk 84 is formed of soft iron and is operated inwardly, against the tension of the springs 89, by a winding 90, when the latter is energized. The winding 90 is connected in series with the motor 76, so that when the latter is started the coil is energized and the brake released.

The limit switch mechanism 91 comprises a casing 92 secured to the cross member 78 and enclosing a pair of switches either of which is opened to break the motor circuit by a device operated by the rock shaft 93. 94 indicates an arm fixed to the rock shaft 93. The outer end of the arm is bifurcated and formed with aligned openings to receive a rotatable plug which is slotted to slidably receive a bar 95.

The inner end of the bar 95 is pivotally connected to the frame 55; its outer portion is provided with adjustable tappets 96 disposed on opposite sides of the arm 94, whereby movement of the frame 55 in either direction will move one of the tappets into engagement with the arm 94 and cause it to swing and thus rock the shaft 93 which in turn will open one of the switches and break the circuit to the motor 76. The switches and the device for opening either thereof and the rock shaft are preferably similar to corresponding parts shown in Letters Patent No. 1,726,717 granted to me September 3, 1929. As will be understood, the tappets 96 are adjustably secured on the rod 95 and are positioned to effect opening of the circuit when the platform 4 reaches its limit of movement in either direction. The platform 4 is preferably extended outwardly beyond the frame 45 and has lateral portions 97 forming guards for the wheels 46. The side edges of the platform may be reinforced by the angles 98.

It will be noted that the steering of the traction portion is effected by a single wheel 6 disposed midway between the sides of the frame 5 at its outer end and that this wheel turns about an axis which intersects the wheel axis, whereby it has an angular turning movement of 90°. When the steering wheel is turned to any desired angle and the traction wheels are driven, the outer end of the connector 33 is swung laterally and the latter in turn swings the load carrying portion in the same lateral direction, so that by driving the traction portion first in one direction and then in the other direction and manipulating the steering wheel to different angular positions during such movements, the load carrying portion may be maneuvered in the available space to position it in operative relation to the load for picking the latter up or to the space to receive a load, even where the space is restricted in width and the area forward thereof is considerably less than the length of the truck. Any such operation is greatly facilitated where the steering wheel has a turning movement of 90°, since in such arrangement the outer end of the connector may be swung on an arc the center of which constitutes the point of contact of one of the traction wheels 7 with the floor, thereby making it possible to project the load carrying portion 3 into load pick-up or discharging position where the load receiving space is relatively narrow and the area forward thereof is unduly restricted.

From the foregoing description it will be seen that my truck consists of articulated portions or members and that by steering the wheel 6 and driving the wheels 7, the inner end of the frame 5 may be swung in either direction as driving forwardly or backwardly takes place, and these movements of the frame 5 serve to turn and drive the frame 45 in rectilinear and curvilinear directions at the will of the operative, with the result that the load carrying member 3 can be positively controlled to position it below a load or to discharge the load in any desired position, in or among obstructions where an ordinary elevating truck would be incapable of movement endwise, and also to effect loading and unloading of a maximum number of loads in a predetermined space, as hereinafter set forth. This form of construction also permits the truck to be driven through lanes having relatively short angular turns.

In Figs. 14, 16, 18 and 19 I have shown certain steps of my improved process in completely loading a freight box car, which is shown diagrammatically in plan at A, the flooring being shown at $a$, the side and end walls at $a'$, and door openings at $a^2$, and wherein it is proposed to position on the floor $a$ of the car in the spaces between the door openings $a^2$ and the end walls eight load units B (four units B', B$^2$, B$^3$, B$^4$, at either side of the door openings); also, when desired, two units B$^5$, B$^6$ may be positioned in the space between the door openings $a^2$—see dotted lines in Fig. 18. As will be understood from Figs. 15 and 17, the units are mounted on skids C, but when the load engaging member is movable into close relation to the floor, as shown in Fig. 8, the units may be mounted on suitable blocks or strips to permit the projecting of the load engaging member below the load unit.

In carrying out my process, I first position the units B', B$^2$, at or adjacent one end of the car; next I position the unit B$^3$ at the near side of the car with reference to the door $a^2$ through which loading is being effected, and adjacent the space in front of the door, the manner of carrying out this step being shown in dotted lines and the final position of the load unit being shown in full lines in Fig. 14. As shown, the operative, by the manipulation of the steering wheel 12 and lever 30 to steer the wheel 6 and drive the traction member 2, is able to steer and control the angular relation of the truck portions 2, 3, and the direction of movement of the load carrying portion or member 3 from a point outside the car to the final position of the load unit B$^3$ within the car, with the load unit in elevated position (see Fig. 15); next, I lower the platform 4 to discharge the load unit—see Figs. 16 and 17—and remove or withdraw the truck, this latter operation being shown in Fig. 17. Next, I pick up the load unit B$^4$ and position it at the remote side of the car, the manner of carrying out this step being shown in dotted lines and the final position of the load unit being shown in full lines in Fig. 18. As shown, the operative, to carry out this step, manipulates the steering wheel 12 and lever 30 to steer the wheel 6 and drive the traction member 2 and thereby steers and controls the direction of movement of the load carrying member 3 from a point outside the car A to the final position of the load unit B$^4$ within the car. Next, I lower the platform 4 to discharge the load unit and remove or withdraw the truck 1, this operation being shown in dotted lines in Fig. 19.

The process of loading the four units at the other end of the car A is effected in the same manner as that just described.

Further, in unloading the four units at either end of the car A, the sequence of operations above set forth is reversed.

I have shown my process as applied to the loading of four units at each end of the car in two longitudinal rows with two units in each row; but where the units are smaller in size there may be a large number in each row or a great number of rows according to the shape and size of the units. Where the units to be loaded permit of these conditions, the size of the loading carrying member 3 will be changed accordingly; the connection 43—44 between the two truck members 2, 3, permitting one sized member 3 to be substituted for another member of a different size without affecting the manner of controlling the truck 1. To insure the loading of the maximum number of units, the first unit of each transverse row is first positioned against or adjacent the near side wall $a'$ and then the additional unit or units are successively positioned toward the remote side of the car. When the two end portions of the car are filled, then the floor space between the doors $a^2$ are loaded, as shown in dotted lines in Fig. 19, by the units B$^5$, B$^6$.

In unloading the car, the removal of the units is effected in the reverse order from that carried out in loading the car.

In the form of construction shown in Figs. 8, 9, and 10, I have shown a tiering type of truck permitting the load units to be stacked one on another or removed from their stacked positions. In these views, 2a indicates as an entirety the traction portion of the truck (which may be similar in construction to the traction portion shown in Figs. 1 and 2) and 3a indicates as an entirety the load handling portion or member comprising a pair of frame sills or channels 99 connected by a plate 99a and rigidly supporting a pair of upright channels 99. The plate 98 is extended laterally at either side to cover and protect the wheels 46b. 100a indicates a pair of plates suitably connected to the channels 99 and forming brackets for a rod or shaft 101 on which are swingably mounted a pair of bars 102. The upper ends of the bars are pivotally connected to brackets 103, which in turn are rigidly connected to a pair of I-beams 104 constituting a guide frame for an elevating member 105, the I-beams being connected in rigid relation by suitable devices, one of which is a plate 106. In the present illustrated form of construction, the guide frame is swingably supported by the bars 102, so that when the latter are operated in the manner to be later described, the guide frame is elevated and swung rearwardly, the effect of which movement is to tilt the elevating member, whereby the load thereon can be transported with less danger of its being jarred off. In this form of construction an inter-locking slidable, pivotal connection 107 is provided between the lower portion of the guide frame and the frame 99. The connection 107 preferably comprises a pair of plates 108 secured to the sills 99 and formed with aligned openings 109 to receive a shaft 110. The shaft loosely supports a pair of rolls 111 on which the I-beams roll as they are operated from the full line position to the dotted line position shown in Fig. 11. The I-beams 104 support a pair of rearwardly extending arms 112 having formed in them aligned elongated slots 113 through which the shaft 110 extends. The rolls 111 permit the I-beams 104 to slide and also swing relative to the frame 99 and the engagement of the shaft 110 with the walls of the slots 113 connect the beams to the plates 108.

The elevating member 105 comprises a pair of plates 114 preferably disposed on the outer sides of the beams 104 and connected by transverse members 115, 116. The plates 114 carry pairs of guide rollers 117, 118, arranged to engage the I-beams and thus slidably support the elevating member 105 thereon.

At their outer ends, the plates 114 support a transverse rod or shaft on which is pivotally mounted the load engaging and supporting element 105a preferably comprising a plurality of L-shaped arms, whereby their horizontal legs may be disposed relatively close to the floor.

The mechanism, indicated as an entirety at 119, for raising and lowering the elevating member and for swinging or tilting the guide frame to tilt the load is substantially similar to corresponding elements shown and described in and forming the subject-matter of my co-pending application Ser. No. 48,421 (see Letters Patent No. 1,777,476), except that such mechanism has associated with it a load gripping or clamping means indicated as an entirety at 120, which means forms the subject-matter of another co-pending application Ser. No. 138,763, for which reasons no claim is made herein to such mechanism or such means.

Referring to the mechanism 119 for raising and lowering the load and tilting the guide frame, 121 indicates a motor connected to and operating a suitable differential mechanism housed in the casing 122. 121a indicates a controller connected in the circuit between the motor 121 and the batteries 17b. The shaft sections driven by the differential mechanisms are connected to two drums 122 within casings 123. The drums 122 are normally locked by magnetically controlled brakes (not shown), the coils of which are connected in series with the motor circuit in such manner that either may be energized and the adjacent brake released, dependent upon the operation of a selector (not shown) when the controller is operated to drive the motor 121 in either direction. Accordingly, by the release of one drum 122 or the other, the load may be moved vertically or the guide frame swung in either direction. The power means and braking or locking devices and the release means therefor forms the subject-matter of a co-pending application Ser. No. 749,141, for which reason no claim is made thereto in this application. 125 indicates a cable reeved over or around a guide sheave 126' mounted on the adjacent bar 102 and over and around sheaves 126 suitably supported on a shaft 126a on the upper end of the guide frame and a sheave 127 supported on the elevating member 105 in the manner to be later set forth, the inner end of the cable being arranged to wind on and off one of the drums 122 and its opposite end being connected to a slack take-up means indicated at 128. The slack take-up means forms the subject-matter of a co-pending application filed by Amiel G. Hutzley, Ser. No. 722,125 (see Letters Patent No. 1,690,681, dated November 6, 1928). 129 indicates a cable one end of which is arranged to wind on and off the other drum 122 and to extend to and around a sheave 130 supported on a shaft 130a carried by the bars 100 and then to and around a sheave 131 on the shaft 126a, its opposite end being anchored in any desired manner, preferably on the shaft 130a. By rotating the drum 122 to which the cable 129 is connected to wind it thereon the guide frame will swing to the position shown in dotted lines in Fig. 8; and by rotating the drum to pay out the cable, the guide frame will swing to its vertical or normal position. The gripping or clamping means 120 comprise a rocker 132 trunnioned on a transverse rod 133 which is supported at its ends in openings formed in the plates 114. The rocker 132 carries at one end a load clamping device 134 and at its opposite end a shaft 135 on which the sheave 127 is loosely mounted. 136 indicates a plurality of springs interposed between a rod 137 carried by the rocker frame 132 and the connecting device 116 and normally operating to swing the outer end of the rocker frame 132 upwardly and its inner end downwardly, as shown in full lines in Fig. 8. However, when the power means is operated to lift the load, the pull on the cable 125 will first be effective through the sheave 127 to rock the frame 132 and thus move the device 134 into engagement with the load, as shown in dotted lines in Fig. 8, and as the pull by the cable on the sheave 127 continues it will raise the elevating member 105 and maintain the device 134 in clamping engagement with the load.

I prefer to provide a limit switch mechanism 105b for stopping the motor 121 when the elevating member reaches the end of its movement vertically in either direction and a limit switch mechanism 102a for stopping the motor 121 when the guide frame reaches the end of its swinging movement in either direction.

Referring to Figs. 11, 12, and 13, 2b indicates the traction portion and 3b indicates the load handling portion of a truck, which portions may be constructed in a manner similar to that shown in Figs. 1 to 7, inclusive. 33b indicates a connector for connecting the portions 2b, 3b, together. The connection between one end of the connector 33b and the load handling portion 3b is preferably similar to that shown in Figs. 1, 2, 3, 5 and 6, but the opposite end of the connector 33b is keyed or otherwise connected to a shaft 138 and the latter carries a crank arm 139, whereby the shaft may be rotated in either direction to swing the connector 33b laterally and thus positively swing the inner end of the load carrying portion 3b (see dotted lines in Fig. 11) to control its steering and direction of movement, which operation is supplemented by the steering of the traction portion 2b. 140, 140a, indicate bearings for the shaft 138, the former being mounted on a plate 141 mounted on the frame 5b and the latter being mounted on a cross support 142 extending between the depending plates 34b. The bearings serve to prevent movement of the shaft downwardly. The lower portion of the shaft 138 is preferably of polygonal shape in cross section and fits a correspondingly shaped socket piece carried on the adjacent end of the connector 33b, the walls of such socket piece being split so that by means of a bolt 142', they may be tightened against the shaft 138 (see Fig. 13). The crank arm 139 is preferably in the form of a gear sector, whereby it may be operated by power means 143. Of the power means 143, 144 indicates a motor adapted to use current supplied by the batteries 17b. The shaft of the motor is controlled by a brake 145, preferably similar to the brake means shown in Fig. 4. The motor shaft is provided with a spur gear 146 which drives a gear on a shaft 147. The shaft 147 is provided with a worm which drives a worm gear 148 keyed to a shaft 149. The shaft 149 is provided with a pinion 150 which meshes with the gear sector. 151 is a controller connected in the circuit for the motor 144 and serving to drive it in either direction whereby the connector may be swung laterally in either direction—see dotted lines in Fig. 11.

It will be apparent that in the form of construction shown in Fig. 11 the load carrying portion 3b may be controlled or manipulated while the truck portion 2b is standing still as well as during its movement. When such control and manipulation is effected while the truck is being driven, the power and control means co-operates with the steering means for the traction portion 2b to more positively, as well as quickly, control the movement and steering of the portion 3b as well as to dispose it at a somewhat shorter angle, whereby loading and unloading and driving movement of the truck can be carried out where greatly congested conditions prevail.

148 indicates a brace extending from the shaft 138 to the outer portion of the connector 33b, such brace preferably comprising a pair of tie rods connected in a suitable manner at their inner ends to the opposite sides of a collar 149 clamped to the shaft 138 and at their outer ends to lugs 152 secured to the outer sides of the connector 33b.

Where a shorter freight car is used, the inner load units project into the space in front of the car doors, in which event only one unit can be loaded in this space. Where a longer freight car is used, additional units can be placed therein.

It will be understood that in my process different sizes of load units may be loaded and unloaded in compartments and otherwise handled and that the units to be handled may be of different sizes irrespective of the skids C used to support them.

To those skilled in the art to which my invention relates, many changes in construction and widely differing embodiments and applications thereof will suggest themselves without departing from the scope of the invention. My disclosures and the description herein are purely illustrative and are not intended to be in any sense limiting.

What I claim is:

1. A truck comprising a sectional articulatable frame having a driving and steering portion and a load carrying portion, a pair of wheels entirely below said load carrying portion, supporting and traction wheels for said driving and steering portion operable to drive said portion in either direction, means for driving certain of the last mentioned wheels, means for steering certain of the last mentioned wheels, means for connecting said portions together to form said sectional frame, said means comprising a connector pivotally connected at one end on a vertical axis to said driving and steering portion and a universal joint between the opposite end of said connector and the other frame portion, separate devices at one end of said driving and steering frame portion for operating the driving means and the steering means, and means for swinging said connector laterally about said axis to affect steering of said load carrying portion.

2. A truck comprising a sectional articulatable frame having a driving and steering portion and a load carrying portion, a pair of wheels entirely below said load carrying portion, supporting and traction wheels for said driving and steering portion operable to drive said portion in either direction, means for driving certain of the last mentioned wheels, means for steering certain of the last mentioned wheels, means for connecting said portions together to form said sectional frame, said means comprising a shaft mounted vertically at the inner end of said driving and steering frame portion, a connector fixed to said shaft and extending horizontally outwardly therefrom and a universal joint between the outer end of said connector and the inner end of said load carrying frame portion, said connector serving to steer said load carrying portion when moved laterally, separate devices at one end of said driving and steering frame portion for operating the driving means and the steering means, and means for rotating said shaft.

3. A truck comprising a sectional articulatable frame having a driving and steering portion and a load carrying portion, a pair of wheels entirely below said load carrying portion, supporting and traction wheels for said driving and steering portion operable to drive said portion in either direction, means for driving certain of the last mentioned wheels, means for steering certain of the last mentioned wheels, means for connecting said portions together to form said sectional frame, said means comprising a connector pivotally connected at one end on a vertical axis to effect steering of said load carrying portion, and a universal joint between the opposite end of said connector and the other frame portion, means for swinging said connector about the pivot at one end thereof, and devices at one end of said driving and steering portion for operating said driving means, steering means and connector swinging means, respectively.

4. A truck comprising a sectional articulatable frame having a driving and steering portion and a load carrying portion disposed in a plane below said driving and steering portion, a pair of load wheels entirely below said load carrying portion, supporting and traction wheels for said driving and steering portion operable to drive said portion in either direction, means for driving certain of the last mentioned wheels, means for steering certain of the last mentioned wheels, a vertical shaft at the inner end of said driving and steering portion, a connector fixed to the lower portion of said shaft in the plane of said load carrying portion and extending outwardly from said shaft, a universal joint connection between the outer end of said connector and the inner end of said load carrying portion, means for rotating said shaft to swing said connector laterally, whereby the latter steers said load engaging portion, and separate means at one end of said driving and steering portion for operating said driving means, said steering means and said shaft rotating means.

5. A truck frame having a driving and steering portion and a load carrying portion comprising a relatively low horizontal frame adapted to be projected below a load, a connector between said portions, said connector being supported at one end by said first mentioned portion in horizontal position against swinging movement vertically and connected at its opposite end by a universal joint to the inner end of said last mentioned portion to permit articulation of said portions one relative to the other, said portions being operable as a unitary structure in either direction to maneuver said load carrying portion at angles to said driving and steering portion into load engaging and discharging positions, a set of three wheels for supporting said first mentioned portion, certain of said wheels being driven and the single wheel of said set being revoluble about a vertical axis for steering, a pair of wheels for supporting the outer end of said load carrying portion, and separate means at one end of said main portion for operating the driving means for the driven wheels and for operating said steering wheel.

6. A truck frame having a relatively short driving and steering portion and a load carrying portion comprising a relatively low horizontal frame adapted to be projected below a load, a connector between said portions, said connector being supported at one end by said first mentioned portion in horizontal position against swinging movement vertically and connected at its opposite end by a universal joint to the inner end of said last mentioned portion to permit articulation of said portions one relative to the other, said portions being operable as a unitary structure in either direction to maneuver said load carrying portion at angles to said driving and steering portion into load engaging and discharging positions, a set of three wheels for supporting said first mentioned portion, certain of said wheels being driven and the single wheel of said set being revoluble about a vertical axis cutting the tread of the wheel for steering, a pair of wheels for supporting the outer end of said load carrying portion, and separate means at one end of said first mentioned portion for operating the driving means for said driven wheels and for operating said steering wheel.

7. A truck frame having a driving and steering portion and a load carrying portion comprising a relatively low horizontal frame adapted to be projected below a load, a connector between said portions, said connector being supported at one end by said first mentioned portion in horizontal position against swinging movement vertically and connected at its opposite end by a universal joint to the inner end of said last mentioned portion to permit articulation of said portions one relative to the other, said portions being operable as a unitary structure in either direction to maneuver said load carrying portion at angles to said driving and steering portion into load engaging and discharging positions, a pair of traction wheels disposed below the inner end of said first mentioned portion, a wheel disposed below the outer end of said first mentioned portion, the last mentioned wheel being mounted to revolve about the vertical axis cutting the tread of said wheel for steering the truck, a pair of wheels for supporting the outer end of said load carrying portion, and separate means for operating the driving means for said traction wheels and for operating said steering wheel.

In testimony whereof, I have hereunto subscribed my name.

EDWARD H. REMDE.

CERTIFICATE OF CORRECTION.

Patent No. 1,883,319.   October 18, 1932.

EDWARD H. REMDE.

It is hereby certified that error appears in the printed specifications of the above numbered patent requiring correction as follows: Page 6, line 70, after "749,141" and before the comma, insert (see Letters Patent No. 1,725,968); page 8, line 27, claim 3, strike out the words "effect steering of said load carrying portion," and insert instead said driving and steering portion; and line 31, for "about the pivot at one end thereof" read laterally about said axis to effect steering of said load carrying portion; same page, line 83, claim 5, for "main" read first mentioned; and that the said Letters Patent should be read with these corrections therein that the same may conform to the record of the case in the Patent Office.

Signed and sealed this 14th day of November, A. D. 1933.

(Seal)

F. M. Hopkins
Acting Commissioner of Patents.

wheel disposed below the outer end of said first mentioned portion, the last mentioned wheel being mounted to revolve about the vertical axis cutting the tread of said wheel for steering the truck, a pair of wheels for supporting the outer end of said load carrying portion, and separate means for operating the driving means for said traction wheels and for operating said steering wheel.

In testimony whereof, I have hereunto subscribed my name.

EDWARD H. REMDE.

CERTIFICATE OF CORRECTION.

Patent No. 1,883,319.     October 18, 1932.

EDWARD H. REMDE.

It is hereby certified that error appears in the printed specifications of the above numbered patent requiring correction as follows: Page 6, line 70, after "749,141" and before the comma, insert (see Letters Patent No. 1,725,968); page 8, line 27, claim 3, strike out the words "effect steering of said load carrying portion," and insert instead said driving and steering portion; and line 31, for "about the pivot at one end thereof" read laterally about said axis to effect steering of said load carrying portion; same page, line 83, claim 5, for "main" read first mentioned; and that the said Letters Patent should be read with these corrections therein that the same may conform to the record of the case in the Patent Office.

Signed and sealed this 14th day of November, A. D. 1933.

F. M. Hopkins
Acting Commissioner of Patents.

(Seal)

CERTIFICATE OF CORRECTION.

Patent No. 1,883,319.  October 18, 1932.

EDWARD H. REMDE.

It is hereby certified that error appears in the printed specifications of the above numbered patent requiring correction as follows: Page 6, line 70, after "749,141" and before the comma, insert (see Letters Patent No. 1,725,968); page 8, line 27, claim 3, strike out the words "effect steering of said load carrying portion," and insert instead said driving and steering portion; and line 31, for "about the pivot at one end thereof" read laterally about said axis to effect steering of said load carrying portion; same page, line 83, claim 5, for "main" read first mentioned; and that the said Letters Patent should be read with these corrections therein that the same may conform to the record of the case in the Patent Office.

Signed and sealed this 14th day of November, A. D. 1933.

(Seal)

F. M. Hopkins
Acting Commissioner of Patents.